Dec. 5, 1967    F. J. BRANDENBURG    3,356,829
RADIANT HEATING DEVICE
Filed Feb. 7, 1966    2 Sheets-Sheet 1
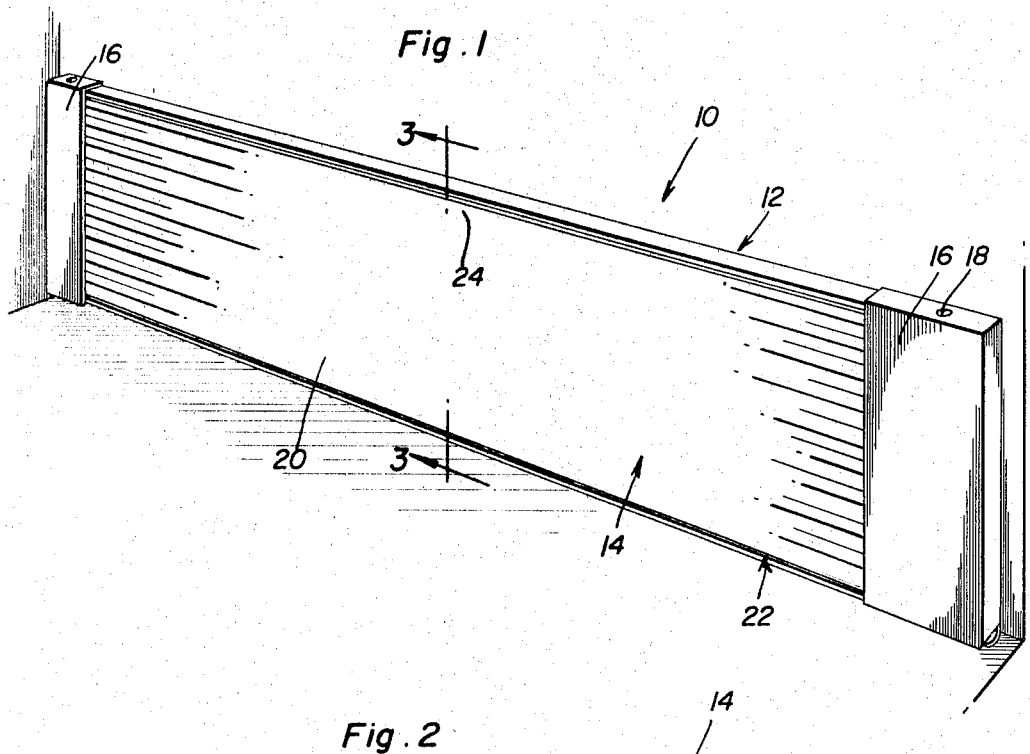
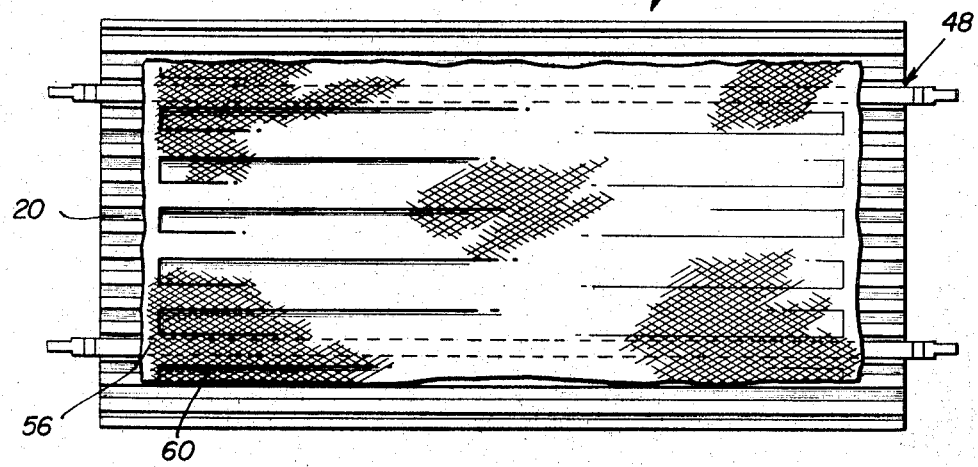
Frank J. Brandenburg
INVENTOR.

Dec. 5, 1967  F. J. BRANDENBURG  3,356,829
RADIANT HEATING DEVICE

Filed Feb. 7, 1966 2 Sheets-Sheet 2

Frank J. Brandenburg
INVENTOR.

BY Clarence A. O'Brien
and Harvey B. Jacobson
Attorneys

United States Patent Office 3,356,829
Patented Dec. 5, 1967

3,356,829
RADIANT HEATING DEVICE
Frank J. Brandenburg, 1926 Broad Rock Road,
Richmond, Va. 23224
Filed Feb. 7, 1966, Ser. No. 525,719
6 Claims. (Cl. 219—365)

This invention relates to a space heating device embodying certain improvements over the heater disclosed and claimed in my prior copending application, U.S. Ser. No. 235,020, filed Nov. 2, 1962, now Patent No. 3,246,120, with respect to which the present application is a continuation in part.

It is therefore a primary object of the present invention to provide a heating device for enclosed spaces such as the ineriors of buildings or homes adaped to be mounted as baseboard units of any desired length depending upon the heating requirements.

An additional object of the present invention in accordance with the foregoing object is to provide a space heating device transmitting heat by both radiation and convection for balanced comfort of persons within the heated environment.

A further object of the present invention is to provide a space heating device of the aforementioned type having a self-modulated heat control capability which permits operation of the heating device in such a manner as to consume electrical energy with unexpected economy.

A still further object of the present invention is to provide a space heating device of the aforementioned type which is easy to install and capable of being manufactured in an economic fashion.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating a typical installation of the space heating device of the present invention;

FIGURE 2 is a rear elevational view of a heating panel constructed in accordance with the present invention;

Figure 3:
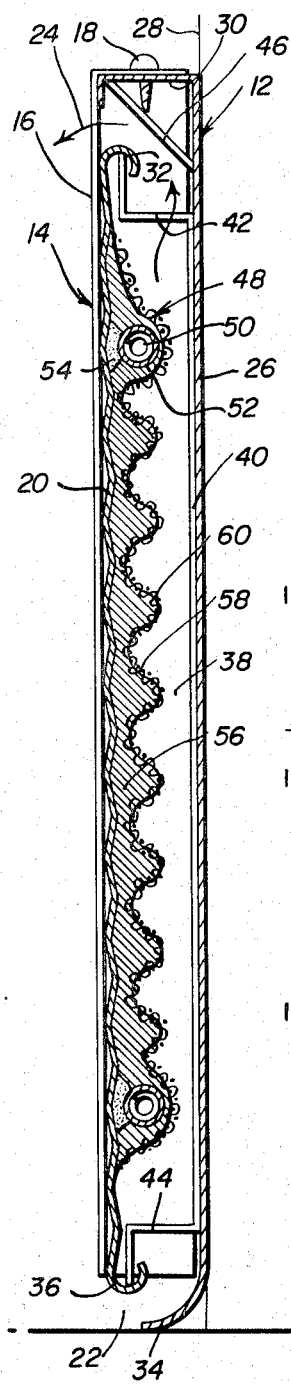
FIGURE 3 is a transverse sectional view taken substantially through a plane indicated by section line 3—3 in FIGURE 1.

Referring now to the drawings in detail, it will be observed from FIGURE 1 that the space heating device generally referred to by reference numeral 10 may be mounted as a baseboard heater along the wall of a room enclosing the space to be heated. The space heating device includes, therefore, a housing generally referred to by reference numeral 12 on which an elongated heating panel assembly 14 is supported. The housing 12 extends between and is connected to a pair of end cover members 16 to which it is secured by means of the screw fasteners 18. Heat is radiated from a corrugated radiating surface member 20 of the panel assembly 14. Heat is also transmitted to the space being heated by means of convection. Accordingly, cool air enters the heating device along the bottom of the panel assembly as indicated by the arrows 22 while heated air exits from the heating device along the upper edge of the panel assembly as indicated by the arrows 24.

Referring now to FIGURE 3 in particular, it will be observed that the housing 12 consists of a relatively flat reflective portion 26 adapted to be secured to a vertical wall surface 28. A top flange 30 projects forwardly from the reflective portion 26 and is secured adjacent the opposite longitudinal ends thereof to the end covers 16 by the fasteners 18 aforementioned. The top flange 30 is spaced above the upper rounded edge portion 32 of the panel assembly 14 so as to form a longitudinal outlet opening for heated air as indicated by the arrows 24. A forwardly curved lower end portion 34 also projects from the flat reflective portion 26 of the housing spaced from a curved lower edge portion 36 of the panel assembly so as to form therewith a longitudinal inlet opening for cold air entering the heating device as indicated by the arrows 22. A flow passage 38 with which the inlet and outlet openings communicate is formed rearwardly of the panel assembly 14. The panel assembly is therefore supported in spaced relation to the reflective portion 26 of the housing by means of a plurality of longitudinally spaced vertical supporting strips 40 having upper and lower supporting flange portions 42 and 44 engaged with the upper and lower edge portions 32 and 36 of the panel assembly. The supporting strips 40 are secured in any suitable fashion to the housing which is also provided with corner braces 46 adjacent the upper end of the housing forming a raceway through which electrical wiring may extend.

The source of heat associated with the space heating device of the instant invention, resides in one or more electrical heat generating elements 48 associated with the panel assembly, two of such heating elements being illustrated by way of example in FIGURES 2 and 3. Each of the electrical heating elements therefore includes an elongated heat generating resistance rod 50 enclosed by a conductive, tubular sheathing 52 which is bonded by a conductive bonding material such as epoxy 54 to the rear side of the corrugated radiating surface member 20. The corrugated surface mamber may be made of a metal such as aluminum for this purpose, the corrugations of which will direct radiation of heat in all directions. It will therefore be apparent that heat emitted by the sheathing 52 of the electrical heat generating elements will be transferred by conduction to the corrugated surface member 20 for radiation therefrom.

Also mounted on and bonded to the radiating surface member 20, is a heat storing material 56 which covers most of the area of the radiating surface member 20 on the rear side thereof facing the reflective portion 26 of the housing. The heat storing material 56 also embeds therewithin the electrical heating elements 48 so that the heat generated by the elements 48 will be transferred by conduction to the heat storing material. It will also be observed from FIGURE 3 that the heat storing material is so formed as to present a corrugated surface 58 to the airflow passage 38. A two-fold purpose is achieved thereby in that a greater surface of the material is exposed to the airflow through which heat may be removed and transmitted to the air space by convection and to form portions of the heat storing material with reduced thickness. The latter purpose of having portions of reduced thickness is significant in obtaining a more rapid curing and bonding of the material 56 to the radiating surface member 20. In this regard, the heat storing material 56 selected is a mineral filled asphaltic substance preferably mixed with sand so as to reduce the cost thereof and improve those physical properties which are useful for the purposes of the present invention. The asphaltic material 56 while thermally non-conductive as compared to the metallic panel member 20 for example, is suitable because of its ability to rapidly absorb heat from the heat generating elements 48 at a heat transfer rate which is substantially higher than the rate with which heat is transmitted from the heating device by both radiation and convection.

Also embedded in the heat storing material 56 is a heat distributing grid 60 which may be made of an aluminum wire mesh. The grid 60 in addition to uniformly distributing heat throughout the material 56, improves the strength of the material 56 so as to retain the corrugated configuration thereof and obtain sufficient bonding to member 20 even before the asphaltic substance has been completely cured and the solvent evaporated. Thus, transport of the heating device and installation thereof may be accomplished more rapidly after its fabrication has been completed.

Figure 4:
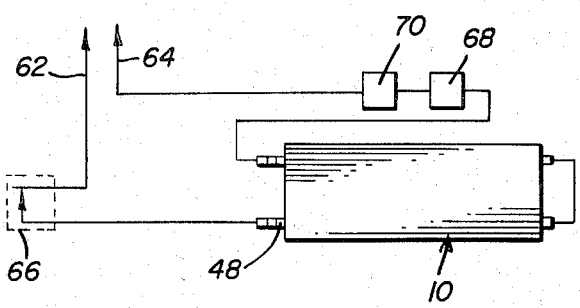
FIGURE 4 is a simplified electrical circuit diagram associated with the heating device of the present invention.
Figure 5:
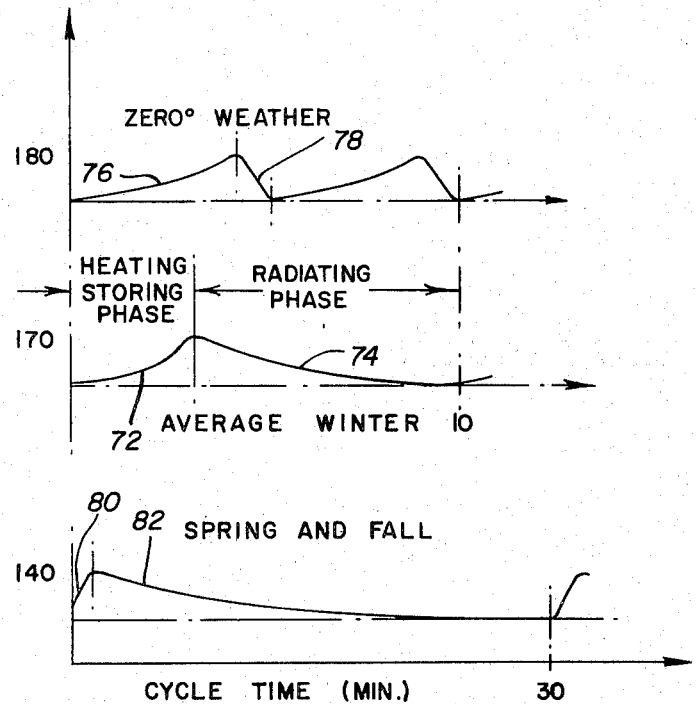
FIGURE 5 is a graphical illustration showing typical operational characteristics of the space heating device.

As shown in FIGURE 4, the source of heat is derived from electrical energy supplied by power lines 62 and 64 connected in series with the thermostat switch 66 and the limit switches 68 and 70 operative to intermittently energize the heating elements 48 to maintain the temperature of the heating device within certain limits. The wiring and limit switches may therefore be supported within the raceway formed by the bracing elements 46 as aforementioned while electrical connections and thermostat controls may be housed within the end covers 16 into which the longitudinal ends of the panel assembly and heating elements 48 extend. Because of the ability of the heat storing material 56 to absorb heat at a higher rate than the heat transmitted from the heating device, it is capable of modulating temperature control in accordance with different heating requirements so as to utilize electrical energy in a more economical fashion. Referring therefore to FIGURE 5, it will be observed that during average winter conditions the heating device may operate on a ten minute cycle including a heat storing phase during which heat is being absorbed by the heat storing material 56 while the electrical heating elements 48 are energized as depicted by the rising temperature curve 72. When a predetermined temperature is acquired, such as 170 degrees Fahrenheit, supply of electrical energy to the heating elements is discontinued so that heat will be removed from the heat storing material 56 less rapidly as indicated by the declining temperature curve 74. The duration of the heat storing phase is indicated to be shorter than the radiating phase for average winter conditions within a predetermined operational cycle of ten minutes. This operational cycle, will, of course, be reduced to five minutes for example in connection with zero degree weather as also shown in FIGURE 5 wherein the duration of the heat storing phase corresponding to the rising temperature curve 76 is longer than the radiating phase corresponding to the declining temperature curve 78. Thus, as the heating load increases, the duration of the heat storing phase increases until the electrical heating element 48 remains continuously energized for maximum output of the heating device. On the other hand, as the heating load decreases, the duration of the heat storing phase decreases with a corresponding increase in the duration of the radiating phase within a substantially increased operational cycle as depicted by the temperature curves 80 and 82 corresponding to spring and fall weather conditions as shown in FIGURE 5. Thus, for any given temperature control setting, regulating intermittent energization of the heating elements 48 between predetermined temperature limits, cyclic operation of the heating device will be self-modulated or changed because of the heat storing property of the material 56 and its physical and thermal relationship to the other parts of the heating device as hereinbefore described.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A space heating device comprising heat emitting means, a corrugated panel made of a heat radiating material conductively bonded to the heat emitting means, a completely non-metallic heat storing mastic bonded to said panel on one side thereof embedding the heat emitting means therein, a heat distribution grid embedded in the mastic closely spaced from the panel, a mounting member, and spacing means supporting the panel on the mounting member establishing an air flow passage between the grid and the mounting member, said heat storing mastic being an asphaltic material.

2. A space heating device comprising heat generating means, radiating surface means conductively bonded to the heat generating means for radiating heat transmitted thereto at a relatively high heat transfer rate, heat storing means bonded to the radiating surface means for simultaneously absorbing heat from the heat generating means and conducting heat to the radiating surface means at a relatively low heat transfer rate, and passage means exposing the heat storing means to a thermally induced flow of air for removal of heat therefrom by convection, said heat storing means being made of a material absorbing heat from the heat generating means at a higher heat transfer rate than the rate of which heat is transmitted by both radiation and convection from the radiating surface means and the passage means, respectively, said material forming the heat storing means being a non-metallic asphaltic mixture.

3. The combination of claim 2 including heat conductive grid means embedded in the material of the heat storing means for uniformly distributing heat therethrough and supporting the material in a predetermined configuration.

4. The combination of claim 3 wherein said passage means comprises a housing having a heat reflective surface, and means supporting the radiating surface means on the housing with the heat storing means spaced from the heat reflective surface for passage of air therebetween.

5. The combination of claim 2 wherein said passage means comprises a housing having a heat reflective surface, and means supporting the radiating surface means on the housing with the heat storing means spaced from the heat reflective surface for passage of air therebetween.

6. The combination of claim 2 wherein said heat generating means includes an electrical heating element.

References Cited

UNITED STATES PATENTS

| | | | |
|---|---|---|---|
| 1,664,171 | 3/1928 | Hicks | 219—377 |
| 1,910,105 | 5/1933 | Herring | 165—171 |
| 2,230,095 | 1/1941 | Van Daam | 219—365 |
| 2,486,791 | 11/1949 | Mann et al. | 219—345 |
| 2,512,875 | 6/1950 | Reynolds | 219—345 |
| 2,598,279 | 5/1952 | McKibbin | 165—180 X |
| 2,623,150 | 12/1952 | Boecher et al. | 219—377 |
| 2,731,242 | 1/1956 | Borg et al. | 165—55 X |
| 2,795,035 | 6/1957 | Kafer | 165—171 X |
| 3,020,379 | 2/1962 | Ludlow et al. | 219—345 |

FOREIGN PATENTS

| | | |
|---|---|---|
| 1,267,919 | 6/1961 | France. |
| 656,811 | 9/1951 | Great Britain. |

ANTHONY BARTIS, *Primary Examiner.*

R. M. WOOD, *Examiner.*